(12) United States Patent
Dai et al.

(10) Patent No.: US 12,149,760 B2
(45) Date of Patent: *Nov. 19, 2024

(54) CONCURRENT DOWNLOADING OF VIDEO

(71) Applicant: HULU, LLC, Santa Monica, CA (US)

(72) Inventors: Tongyu Dai, Beijing (CN); Lan Xie, Beijing (CN); Wenhao Zhang, Beijing (CN); Deliang Fu, Beijing (CN); Chao Li, Beijing (CN); Qiang She, Beijing (CN); Yuting Gui, Beijing (CN); Yicheng Liu, Beijing (CN); Yanping Zhou, Beijing (CN); Xizhi Xu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,878

(22) Filed: Dec. 12, 2022

(65) Prior Publication Data

US 2023/0111188 A1 Apr. 13, 2023

Related U.S. Application Data

(63) Continuation of application No. 17/110,658, filed on Dec. 3, 2020, now Pat. No. 11,570,496.

(51) Int. Cl.
*H04N 21/24* (2011.01)
*H04L 65/612* (2022.01)
(Continued)

(52) U.S. Cl.
CPC ....... *H04N 21/2402* (2013.01); *H04L 65/612* (2022.05); *H04L 65/65* (2022.05);
(Continued)

(58) Field of Classification Search
CPC ........... H04N 21/2402; H04N 21/2407; H04N 21/24; H04N 21/2341; H04N 21/23103;
(Continued)

(56) References Cited

U.S. PATENT DOCUMENTS 9,860,569 B1 * 1/2018 Wilms ............. H04N 21/23418
10,397,051 B1 8/2019 Featonby et al.
(Continued)

FOREIGN PATENT DOCUMENTS

BR  1020210238801   11/2021
CN  106998349 A    8/2017
(Continued)

OTHER PUBLICATIONS

Japanese Office Action, Application No. 2021-196163, mailed Feb. 7, 2023, 5 pages.
(Continued)

*Primary Examiner* — Tonia L Dollinger
*Assistant Examiner* — Mehulkumar J Shah
(74) *Attorney, Agent, or Firm* — Kwan & Olynick LLP

(57) ABSTRACT

In some embodiments, after receiving a first set of video segments of a video, a method starts a first computing instance and receives a video segment of the video using the first computing instance. A measurement is calculated based on receiving the video segment. The method uses the measurement to determine whether the first computing instance should continue to be used to receive video segments in the video or should be terminated to not receive video segments in the video.

19 Claims, 8 Drawing Sheets

(51) Int. Cl.
  *H04L 65/65* (2022.01)
  *H04L 65/75* (2022.01)
  *H04L 65/80* (2022.01)
(52) U.S. Cl.
  CPC .............. *H04L 65/75* (2022.05); *H04L 65/80* (2013.01); *H04N 21/2407* (2013.01)
(58) Field of Classification Search
  CPC ......... H04N 21/2343; H04N 21/23805; H04N 21/44209; H04N 21/4622; H04N 21/8456; H04N 21/6373; H04N 21/4621; H04N 21/23608; H04N 21/26233; H04N 21/4344; H04N 21/238; H04N 21/442; H04N 21/462; H04N 21/845; H04N 21/236; H04N 21/262; H04N 21/434; H04N 21/00–21/858; H04L 65/608; H04L 65/80; H04L 65/4084; H04L 65/601; H04L 29/06; H04L 65/612; H04L 65/752; H04L 67/02; H04L 65/65; H04L 65/75; H04L 67/562
  See application file for complete search history.

(56) References Cited

U.S. PATENT DOCUMENTS

| | | | |
|---|---|---|---|
| 11,153,581 B1* | 10/2021 | Purushe | H04N 21/23439 |
| 11,169,883 B1* | 11/2021 | Burgin | G06F 9/4418 |
| 11,570,496 B2 | 1/2023 | Dai et al. | |
| 2008/0022005 A1 | 1/2008 | Wu et al. | |
| 2011/0153605 A1 | 6/2011 | Silverman | |
| 2013/0124669 A1* | 5/2013 | Anderson | G06F 11/301 |
| | | | 709/224 |
| 2013/0297731 A1 | 11/2013 | Chan et al. | |
| 2015/0134847 A1 | 5/2015 | Fu et al. | |
| 2016/0295474 A1 | 10/2016 | Uchino | |
| 2016/0295480 A1 | 10/2016 | Wakayama | |
| 2017/0046778 A1 | 2/2017 | Corley et al. | |
| 2017/0063945 A1 | 3/2017 | Tsubouchi | |
| 2017/0063955 A1 | 3/2017 | Tsubouchi | |
| 2017/0195387 A1* | 7/2017 | Han | H04L 65/4015 |
| 2018/0094939 A1* | 4/2018 | Holmes | G01C 21/343 |
| 2018/0103296 A1* | 4/2018 | Zhou | H04N 21/4438 |
| 2018/0198818 A1* | 7/2018 | Andrews | H04L 65/80 |
| 2018/0367823 A1* | 12/2018 | Brinkley | H04N 21/8456 |
| 2019/0166395 A1* | 5/2019 | Li | H04N 21/4384 |
| 2019/0306551 A1 | 10/2019 | Arye et al. | |
| 2019/0312797 A1* | 10/2019 | Sen | H04L 43/08 |
| 2020/0145701 A1 | 5/2020 | Liu et al. | |
| 2020/0153805 A1* | 5/2020 | Sen | H04L 63/0457 |
| 2022/0182695 A1 | 6/2022 | Dai et al. | |

FOREIGN PATENT DOCUMENTS

| | | |
|---|---|---|
| CN | 108632541 A | 10/2018 |
| EP | 212119077 | 12/2021 |
| EP | 4009643 A1 | 6/2022 |
| IN | 202144053155 | 11/2021 |
| JP | 2013520119 A | 5/2013 |
| JP | 2016195364 A | 11/2016 |
| JP | 2016197790 A | 11/2016 |
| JP | 2017050681 A | 3/2017 |
| JP | 2017050688 A | 3/2017 |
| JP | 2021196163 A | 12/2021 |
| JP | 2022089183 A | 6/2022 |
| KR | 101702426 | 2/2017 |
| KR | 1020210171332 | 12/2021 |
| WO | 2011101371 A1 | 8/2011 |
| WO | 2020055333 A1 | 3/2020 |

OTHER PUBLICATIONS

European Application Serial No. 21211907.7, Extended Search Report mailed May 11, 2022, 8 pgs.

Indian Application Serial No. 202144053155, Office Action mailed Jun. 14, 2022, 8 pgs.

European Office Action, Application No. EP21211907.7, dated Aug. 2, 2023, 7 pages.

Korean Office Action, Notice of Final Rejection, KR Application No. 10-2021-0171332, Issued Apr. 1, 2024, with Eng. Translation, 6 pages.

Korean Office Action, Notice for Grounds for Rejection, KR Application No. 10-2021-0171332, Issued Jan. 2, 2024, with Eng. Translation, 12 pages.

European Office Action, Application No. EP21211907.7, dated May 21, 2024, 4 pages.

Korean Office Action, Notice of Final Rejection, KR Application No. 10-2021-0171332, Issued Aug. 5, 2024, with Eng. Translation, 6 pages.

\* cited by examiner

CONCURRENT DOWNLOADING OF VIDEO

CROSS REFERENCE TO RELATED APPLICATIONS

This application is a continuation application and, pursuant to 35 U.S.C. § 120, is entitled to and claims the benefit of earlier filed application U.S. application Ser. No. 17/110,658 filed Dec. 3, 2020, the content of which is incorporated herein by reference in its entirety for all purposes.

BACKGROUND

A video streaming system would like to transmit data through a network at the highest video quality that client devices can experience. The underlying transmission bandwidth may directly determine an upper bound of video quality that is possible. For example, the more data that can be sent per time period the better the video quality that can be provided to client devices by sending higher quality video. However, different problems may occur that may limit a network's ability to transmit data effectively. For example, when there is a lot of packet loss in the network, the bandwidth of a connection may be significantly reduced, which ultimately lowers the video quality. Also, if there is no packet loss caused by the network, there may be other problems, such as competition for network resources, that may also degrade the bandwidth.

In one configuration, a client device may initialize a connection with a content delivery network, such as an edge node or a media server. Then, the client device requests video segments one-by-one, and the edge node delivers the video segments through the connection. The quality of the video playback depends entirely on the reliability of the single connection. Accordingly, if any issues occur with this connection, the video quality may be affected.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may use concurrent downloading of video segments via multiple connections to play back a video. For example, a client device may have multiple threads that are downloading segments of the video. The use of multiple threads may increase the overall bandwidth of receiving the video. For example, instead of downloading a video segment one-by-one on a single connection, the client device can download multiple segments in parallel, which may increase the amount of data downloaded per time period. When network bandwidth can support the downloading of multiple video segments on multiple threads at an acceptable bandwidth, the upper boundary of video quality that can be reached may be increased. As the bandwidth of overall video data that is received increases, the client device can display higher quality video. For example, the client device may be able to download video that was transcoded at higher bitrates and/or resolutions, which increases the quality of the video.

The concurrent downloading of video segments may use instances, such as threads, that are used to open connections with an edge node or multiple edge nodes. To control the thread allocation, the client device estimates the bandwidth of concurrently downloading video segments. When using a single connection, the bandwidth estimation may be straightforward, such as the client device may estimate the bandwidth at the end of each segment download by the ratio of download size and download duration. However, when using concurrent downloading, this mechanism of estimating bandwidth may not accurately estimate the bandwidth because the contribution of downloaded data from other threads is not taken into account. Also, using individual estimations of bandwidth for each thread does not account for the concurrent downloading of video because the calculations are not aligned in time. Accordingly, the client device may use an aligned time window-based process to estimate the bandwidth across the multiple threads.

The client device may also control the thread allocation. Each thread may have a connection to download video segments and may occupy a certain amount of computer resources. The client device may analyze the effect of a thread on the bandwidth to determine when to start a new thread to download video segments or terminate a thread. The client device can thus determine an optimal amount of threads to open to download the video concurrently.

System Overview

Figure 1:
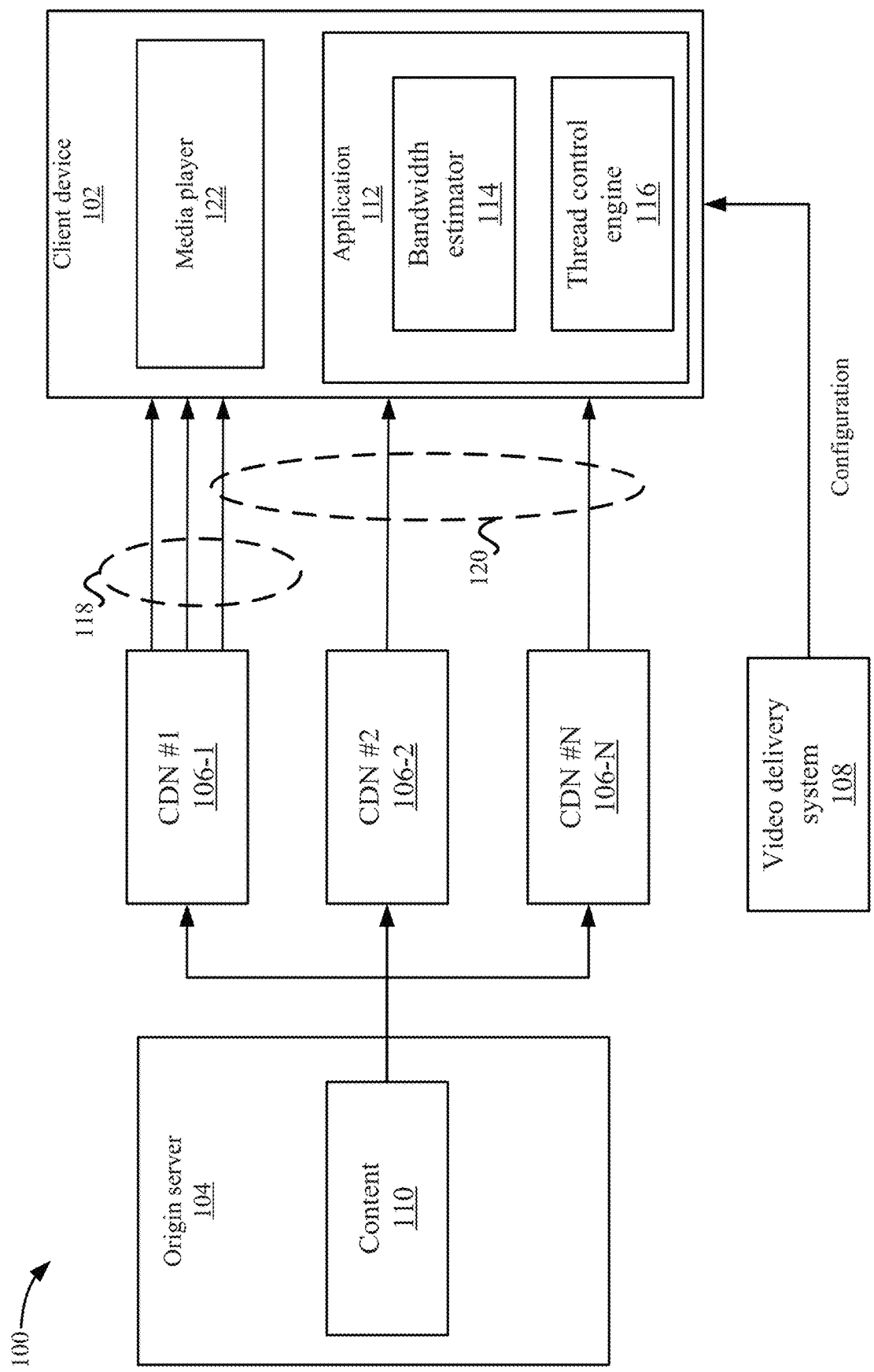
FIG. 1 depicts a simplified system for performing concurrent downloading of video segments for a video according to some embodiments.

FIG. 1 depicts a simplified system 100 for performing concurrent downloading of video segments for a video according to some embodiments. System 100 includes a client device 102, an origin server 104, content delivery networks 106, and a video delivery system 108.

Content delivery networks 106-1 to 106-N (CDN #1, CDN #2, and CDN #N) include computing devices (e.g., servers) that can deliver content 110 to client device 102. Each content delivery network 106 may be independently able to send content 110 to client device 102. Content 110 may be a video, audio, images, or other information. The video may be segmented into portions, which may be referred to as video segments. For example, a video segment may be five seconds of video. The term video will be used for discussion purposes, but other types of content may be used. In some embodiments, the content delivery network 106 may be an independent entity, such as each content delivery network 106 is owned by different companies. These content delivery networks 106 cannot coordinate the delivery of a video as they are separate entities. Content delivery networks 106 may include a server, such as an edge node, that may be the device that delivers video segments to client device 102. For example, an edge node may be found on the edge of a network and delivers video segments to client device 102. Although an edge node is described, it will be understood the video segments may be delivered through multiple servers and computing devices.

Origin server 104 may store representations of content 110. For example, the representations may include different playback characteristics for video, such as different representations of a video at different bitrates. Origin server 104 may provide the representations of video to different content delivery networks #1 to #N. Each content delivery network 106 may independently be able to send the video to client device 102. For example, each content delivery network 106 may include one or more servers that can send the content to client device 102.

Client device 102 may include a computing device, such as a smartphone, set top box, tablet device, living room device, gaming console, etc. Also, client device 102 includes a media player 122 that can play the video.

Client device 102 may experience different playback conditions through connections for each content delivery network 106. For example, the playback conditions may differ based on the network being used by each content delivery network 106. This results in the video being delivered at different bandwidths to client device 102. Additionally, although not shown, different client devices 102 may experience different playback conditions from the same content delivery network 106 and/or different content delivery networks 106.

Video delivery system 108 may receive a request for a video and then provide a configuration for playback to client device 102. The configuration may include different settings for the downloading of the video. For example, settings may include different profiles that are available to download the video. The profiles may be summarized in a profile ladder where each profile may be associated with a different bitrate and/or quality (e.g., resolution). The higher the bitrate and/or quality that is used to download the video segments the better the quality of the video being displayed in media player 122. Generally, a higher available bandwidth means more data can be sent and received through a connection, which results in higher quality video segments being downloaded. When used, bandwidth may be based on an amount of data being transmitted through a connection. An estimated bandwidth may be a theoretical measurement of how much data could be transferred. Although bandwidth is described, other video delivery metrics or measurements may be used, such as throughput (e.g., the actual amount of data transferred through a connection).

An application 112 may determine a number of threads to use to download video segments concurrently for a video. For example, at 118, application 112 may download video segments from content delivery network #1 106-1 using multiple concurrent threads where each thread has an open connection to content delivery network 106-1. The open connections may be through the same physical link from content delivery network #1 106-1 to client device 102. However, the upper bound of bandwidth may be limited by the bandwidth of the link. Also, at 120, application 112 may download the video segments through multiple threads that have connections to different content delivery networks 106, such as content delivery network 106-1, 106-2, and 106-N. The paths via different links are different from client device 102 to different content delivery networks 106. This may increase the upper bound of bandwidth because two paths to two different content delivery networks 106 may have more available bandwidth than two paths in the same link to the same content delivery network 106.

Application 112 may control the threads that are used to download video segments. For example, bandwidth estimator 114 may estimate the bandwidth of the concurrent downloading of video segments in multiple threads. Then, a thread control engine 116 may control the number of threads that client device 102 uses to download the video segments based on a thread's effect on the estimated bandwidth. The processes performed by bandwidth estimator 114 and thread control engine 116 will be described in more detail below.

Bandwidth Estimation

Conventionally, when a video segment is downloaded using a single connection, the client device can estimate the bandwidth of the connection according to a download duration and a download size of the video segment. This bandwidth estimation may be accurate for a single download connection using a single thread. However, as discussed above, when using concurrent downloading via multiple threads, the conventional method may not estimate the network bandwidth accurately. Accordingly, bandwidth estimator 114 may use a process that accurately estimates the bandwidth when using multiple threads to concurrently download video segments.

Figure 2:
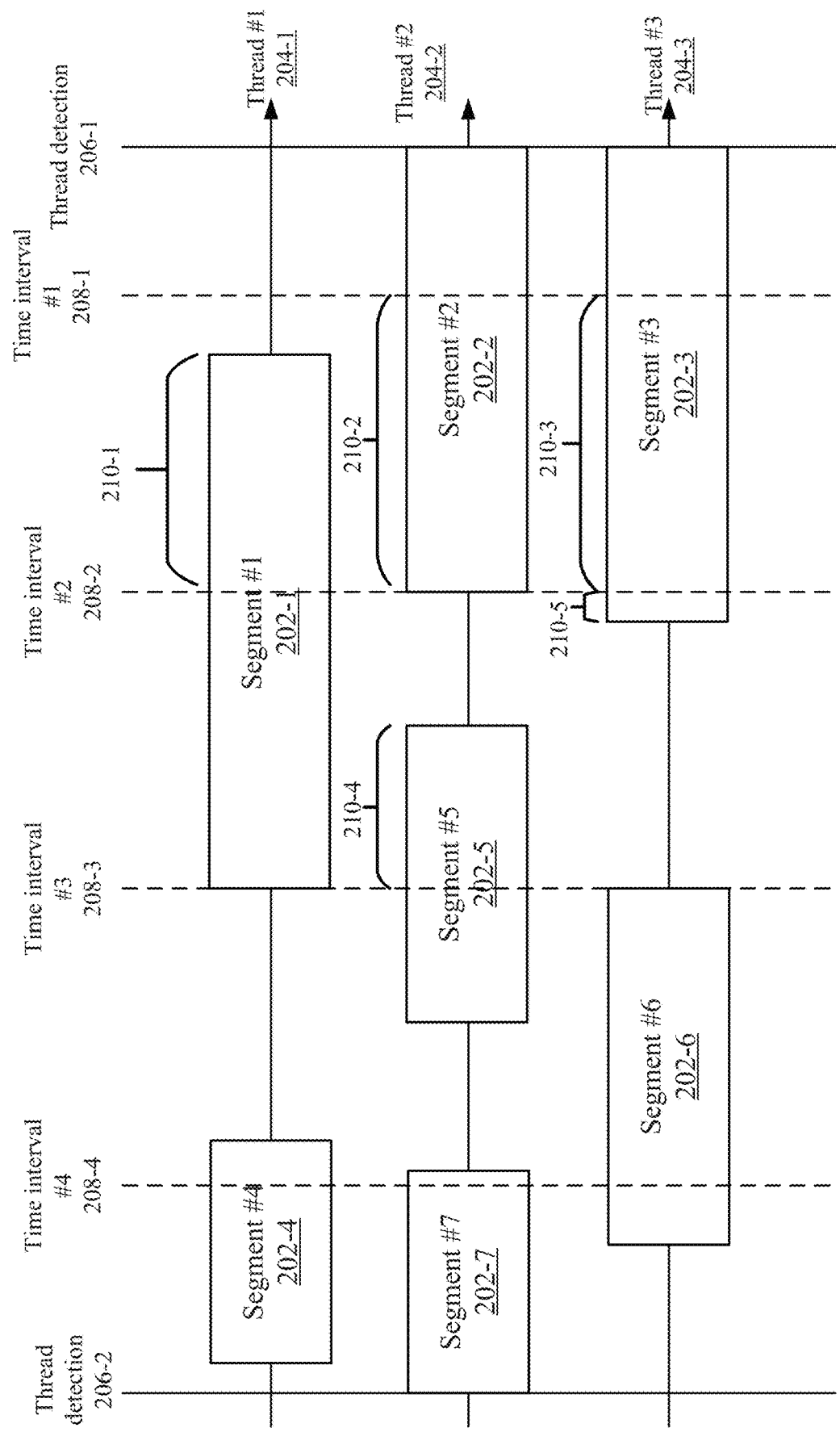
FIG. 2 depicts an example of downloading video segments using multiple threads according to some embodiments.

FIG. 2 depicts an example of downloading video segments 202 using multiple threads 204 according to some embodiments. Client device 102 may have three threads open that are downloading video segments in separate connections, such as a thread #1 204-1, a thread #2 204-2, and a thread #3 204-3. A thread may be a computing resource (e.g., a computer processor) that may be executing on client device 102. For example, a thread may be a process that can separately download video segments through a connection. In some embodiments, threads 204 are downloading video segments 202 from the same video. That is, a video may be made up of a sequential set of video segments and threads 204 may download different video segments from the video concurrently. In one example, each thread 204 may download a unique video segment 202 sequentially in order. For example, thread #1 204-1 may download a video segment #1 202-1; thread #2 204-2 may download a video segment #2 202-2; and thread #3 204-3 may download a video segment #3 202-3. Then, after downloading video segment #1 202-1, thread #1 204-1 downloads a video segment #4 202-4. Thread #2 204-2 downloads a video segment #5 202-5 after downloading video segment #2 202-2, and thread #3 204-3 downloads a video segment #6 202-6 after downloading video segment #3 202-3. Although the above method of downloading segments is described, other methods may be used, such as that each thread 204 may download two consecutive video segments 202, threads 204 may download the same segments 202, etc. Each thread 204 may take a different time to download a video segment 202 depending on network conditions of its respective connection and/or characteristics of the respective video segment. Accordingly, video segments 202 may be downloaded in different time periods.

To obtain an accurate bandwidth estimation of the video segments being concurrently downloaded, bandwidth estimator 114 may use thread detection and an aligned time window to guide the bandwidth estimation process. Bandwidth estimator 114 may use time intervals 208 to estimate the network bandwidth during a time window for each thread 204. For example, a first time window may be based on time interval #1 208-1 and time interval #2 208-2 (e.g., in between). A second time window may be in between time interval #2 208-2 and time interval #3 208-3, and a third time window may be in between time interval #3 208-3 and time interval #4 208-4, and so on.

Bandwidth estimator 114 may also perform thread detection to determine a status of threads 204, such as whether threads 204 are not downloading video. For example, bandwidth estimator 114 may detect whether threads are idle or have been shut down. A thread 204 that is not downloading video may be where a segment 202 is not being sent from a content delivery network 106 on the thread 204. Bandwidth estimator 114 may not estimate bandwidth when all threads 204 are not downloading video (e.g., all threads 204 are idle) because the threads 204 being idle may affect the bandwidth estimation. Measuring the bandwidth while all threads 204 are idle may not be necessary and may cause problems with video playback settings when playback restarts. For example, client device 102 may assume there is very little available bandwidth and adjust the settings for that scenario. However, if bandwidth estimator 114 detects at least one thread 204 as downloading video, then bandwidth estimator 114 may calculate the estimated bandwidth.

Bandwidth estimator 114 may calculate the bandwidth based on a time window and the amount of data downloaded during the time window by threads 204. Bandwidth estimator 114 does not wait for a thread 204 to finish downloading a video segment to perform the calculation if the video segment has not finished downloading when the time window ends. Bandwidth estimator 114 may use different methods to estimate the bandwidth based on downloading activity of threads 204 during the time window. In some examples, bandwidth estimator 114 may calculate the data (e.g., the number of bits or bytes) downloaded by all threads 204 in the time window. For example, if the downloaded bits of threads 1 to n in this time period is $b_1, b_2 \ldots b_n$ and the length of time window is t, the estimated bandwidth $\hat{B}$ can be expressed as follows.

$$\hat{B} = \frac{\sum_{i=1}^{n} b_i}{t}.$$

The above calculation directly represents the cumulative download rate of all download threads 204 during the time window. For example, during a time window #1, bandwidth estimator 114 may estimate the bytes downloaded by thread #1 204-1 at 210-1, the bits downloaded by thread #2 204-2 at 210-2, and the bits downloaded by thread #3 204-3 at 210-3. These are the bits downloaded during the first time interval. Then, bandwidth estimator 114 may divide the bits downloaded by the time in the time window.

When a thread 204 may be idle or shut down, the bandwidth estimation may be affected because fewer bits may be downloaded during this time window compared to a prior time window when thread 204 was downloading data for video segments 202 for the entire time window. When a thread 204 is not downloading data, it may cause noise in the bandwidth calculation. In some embodiments, bandwidth estimator 114 may use a filter that may smooth the bandwidth estimation across time intervals. The filter may adjust a bandwidth calculation based on previous bandwidth calculations. For example, if a first bandwidth calculation is 100 megabytes per second (Mbps) and a subsequent bandwidth calculation is 25 Mbps, then bandwidth estimator 114 may smooth the bandwidth estimate, such as the filter may smooth the bandwidth as 50 Mbps instead of 25 Mbps.

Figure 3:
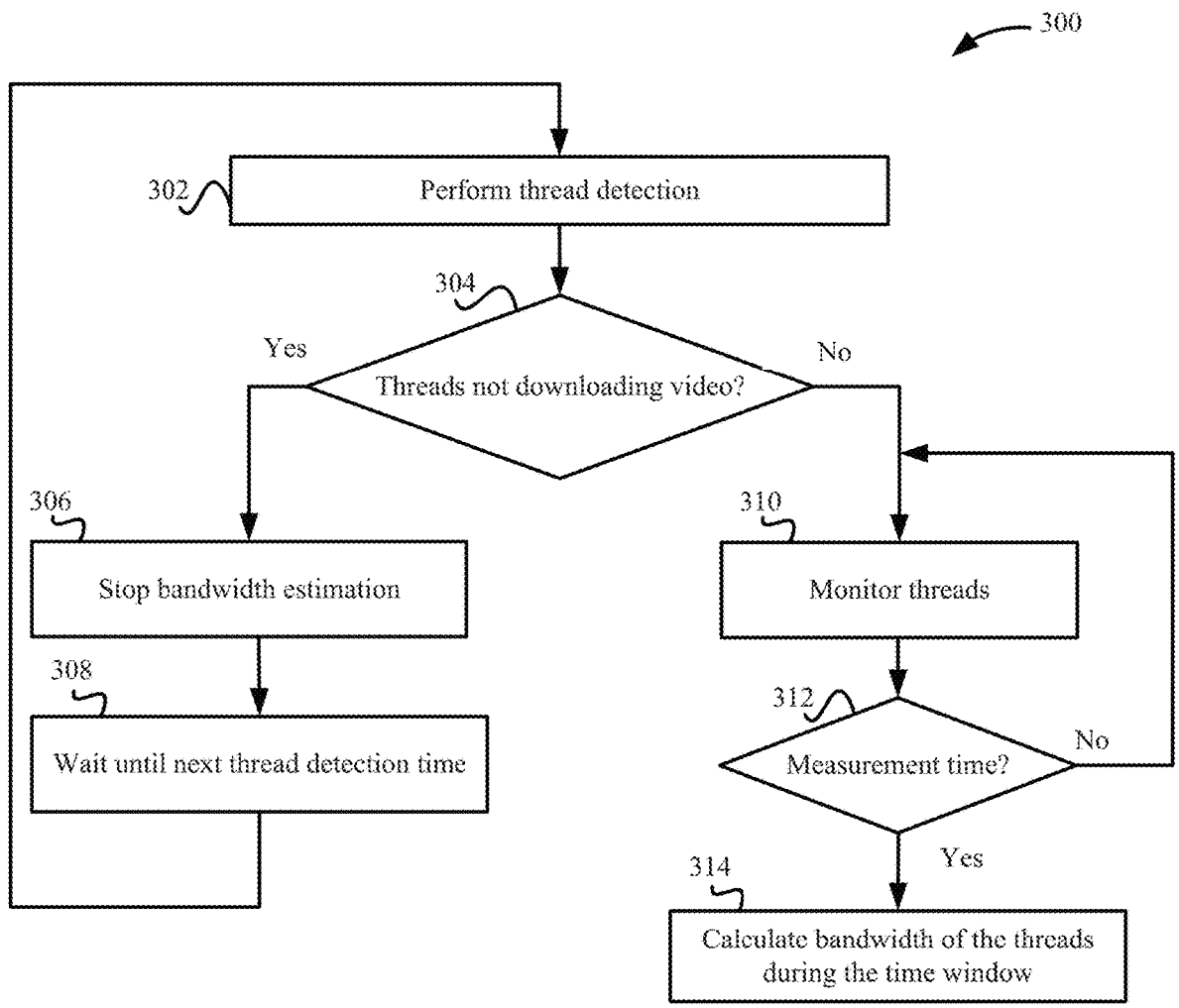
FIG. 3 depicts a simplified flowchart of a method for estimating bandwidth according to some embodiments.

FIG. 3 depicts a simplified flowchart 300 of a method for estimating bandwidth according to some embodiments. At 302, bandwidth estimator 114 performs thread detection. Bandwidth estimator 114 may perform thread detection at an interval (e.g., a predetermined or dynamically determined interval that is based on a condition being met), which may include multiple windows in which bandwidth is estimated. For example, bandwidth estimator 114 may perform thread detection at 206-1 and 206-2. Also, bandwidth estimator 114 may perform thread detection at other intervals, such as at every single time interval 208. Bandwidth estimator 114 uses thread detection to determine whether threads 204 are not downloading video.

At 304, bandwidth estimator 114 determines if threads 204 are not actively downloading video. In some embodiments, bandwidth estimator 114 detects whether all threads 204 are not actively downloading video. Not actively downloading video may be when a thread 204 is idle or shut down. However, a thread 204 may be experiencing delay in downloading video, which may not be considered an idle thread 204. In some embodiments, an idle thread 204 may be a thread where a segment 202 is not being sent from a content delivery network 106 on the thread 204. Although requiring all threads 204 to be not actively downloading video may be used as a threshold, other thresholds may be used, such as a threshold of fewer than two threads 204 actively downloading video. If a number of threads 204 that have stopped downloading video meets a threshold, at 306, bandwidth estimator 114 stops the bandwidth estimation. Stopping the bandwidth estimation may include stopping a timer that is estimating the time interval. Bandwidth estimator 114 may then perform the bandwidth estimation based on the data downloaded in the partial time interval instead of the entire time window. This allows bandwidth estimator 114 to accurately calculate the bandwidth when threads 204 stop downloading data because calculating the bandwidth using a time that threads 204 are not actively downloading data may underestimate the bandwidth. Then, at 308, bandwidth estimator 114 may wait until the next thread detection time to start the bandwidth estimation process again. Bandwidth estimator 114 may also use other methods to restart the bandwidth estimation, such as at the next time interval 208.

If threads 204 are downloading video, at 310, bandwidth estimator 114 monitors the threads 204. For example, bandwidth estimator 114 may determine the amount of data being downloaded by threads 204.

At 312, bandwidth estimator 114 determines if a measurement time is reached, such as the time interval 208 has ended. If not, the process reiterates to continue to monitor threads 204 at 310. If the time interval 208 has ended, at 314, bandwidth estimator 114 calculates the bandwidth of the threads 204 during the time window. Bandwidth estimator 114 may use the calculation as a prediction of available bandwidth that will be used in the thread control process.

In one example, in one time interval 208, if the number of bits downloaded by thread #1 204-1 is 100 Mb, the amount of data downloaded by thread #2 204-2 is 200 Mb, and the amount of data downloaded by thread #3 204-3 is 200 Mb, and the time interval is set to 5 seconds, then the estimated bandwidth is 100+200+200=500/5 seconds=100 Mbps. If each thread 204 analyzed the bandwidth individually, then the estimated bandwidth may not be accurate. Conventionally, the bandwidth estimation calculates the bandwidth in the end of segment downloading. For example, referring to FIG. 2, thread #1 204-1 will calculate the bandwidth estimation value of 100 Mbps at time interval #3 208-3, and thread #2 204-2 will calculate the bandwidth estimation value of 150 Mbps at time interval #2 208-2. If bandwidth estimator 114 calculates the overall bandwidth at time interval #3 208-3 using only thread #1 204-1, the estimated bandwidth will be underestimated by only using the 100 Mbps of thread #1 204-1. The bandwidth is underestimated because during the time at 210-4, thread #2 204-2 downloaded data, and at 210-5, thread #3 204-3 also downloaded data. Those portions of data contributed to the bandwidth, which is not calculated into the overall bandwidth for thread #1. For instance, if segment #5 202-5 is downloaded at 125 Mbps and the portion at 210-4 is 75 Mbps. Also, a portion of the 200 Mbps to download segment #3 202-3 may be 25 Mbps. The bandwidth estimation may be also inaccurate (maybe underestimated or overestimated) by adding the three bandwidths using 100 Mbps+125 Mbps+200 Mbps because the calculation time windows of thread #1 204-1, thread #2 204-2, and thread #2 204-2 are not aligned. The result is not an accurate in a bits per second measurement.

Thread Control

Thread control engine 116 may control threads 204 that are downloading the video segments. For example, thread control engine 116 may determine a number of threads 204 to use concurrently to download video segments. Client device 102 may add threads 204 to download video segments from different content delivery networks 106 or from the same content delivery network 106. Also, client device 102 may remove threads 204 from different content delivery networks 106 or the same content delivery network 106.

Figure 4:
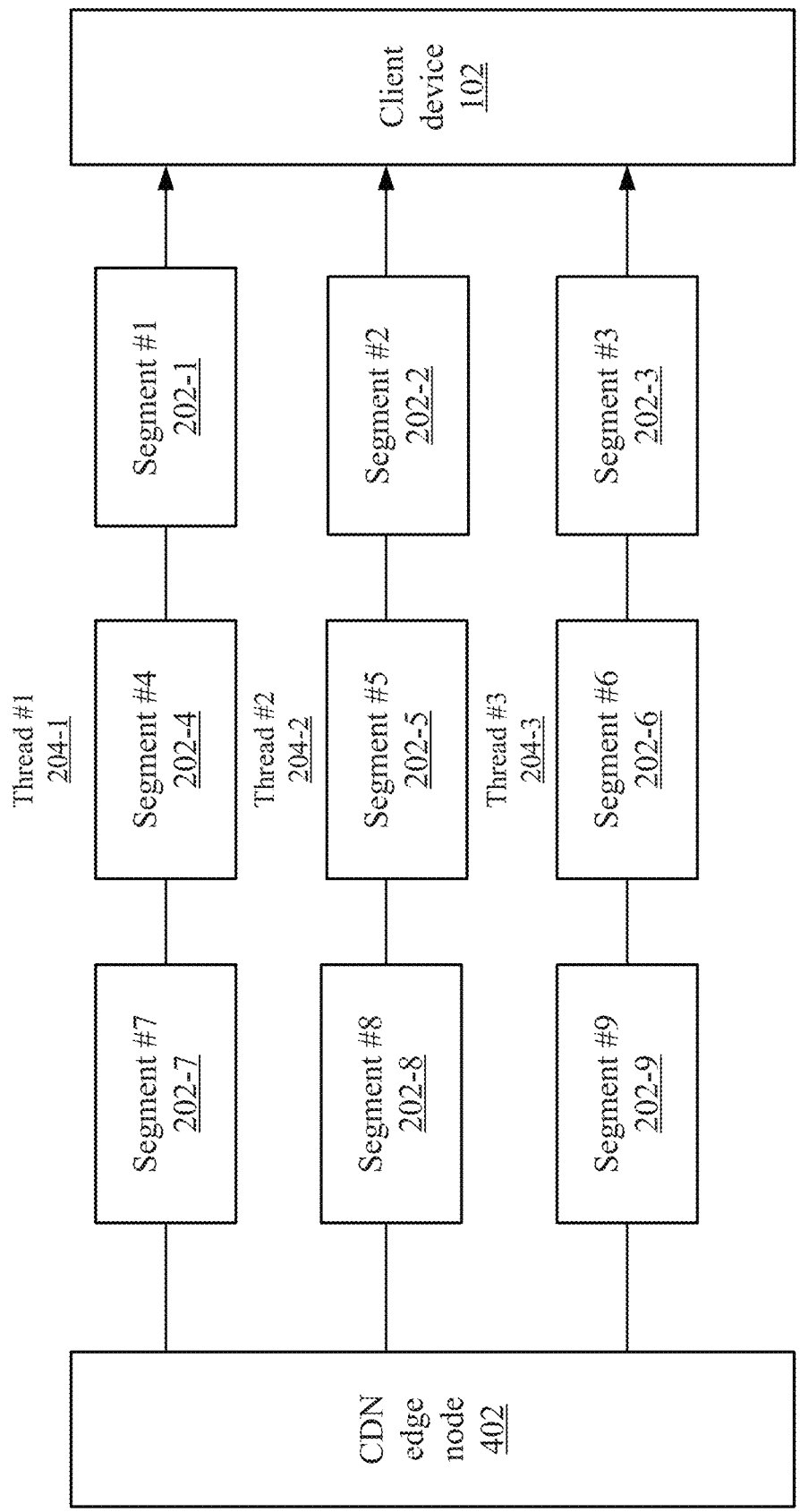
FIG. 4 depicts a configuration in which a client device opens connections with a single content delivery network according to some embodiments.
Figure 5:
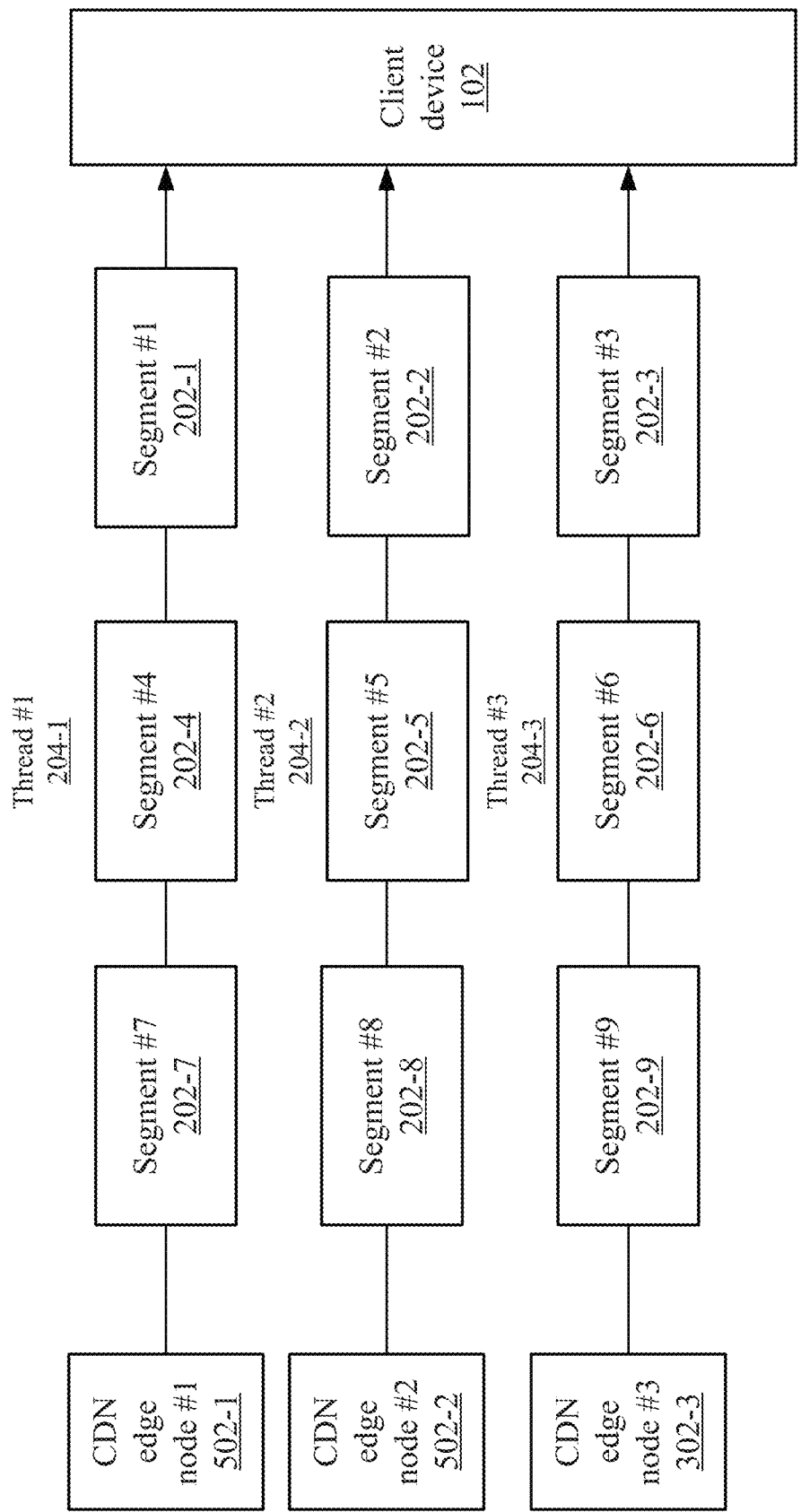
FIG. 5 depicts a configuration in which the client device opens connections with multiple CDN edge nodes according to some embodiments.

Client device 102 may be connected to content delivery networks 106 in different configurations. FIG. 4 and FIG. 5 show two different configurations, but other configurations may be appreciated. FIG. 4 depicts a configuration in which client device 102 opens connections with a single content delivery network 106, such as a single content delivery network (CDN) edge node 402, according to some embodiments. FIG. 5 depicts a configuration in which client device 102 opens connections with multiple CDN edge nodes 402, such as a CDN edge node 402 for different content delivery networks 106, according to some embodiments. However, client device 102 may open multiple connections for the same content delivery network 106 and multiple connections with different content delivery networks 106 in combination.

In FIG. 4, a CDN edge node 402 may be associated with a content delivery network 106. Thread #1 204-1 opens a first connection, thread #2 204-2 opens a second connection, and thread #3 204-3 opens a third connection. All the connections are between CDN edge node 402 and client device 102. CDN edge node 402 may receive the video, such as from origin server 104, and provide video segments that are requested to client device 102. For example, thread #1 204-1 requests and receives segment #1 202-1, segment #4 202-4, and segment #7 202-7. Thread #2 204-2 requests and receives segment #2 202-2, segment #5 202-5, and segment #8 202-8. Finally, thread #3 204-3 requests and receives segment #3 202-3, segment #6 202-6, and segment #9 202-9. Client device 102 may receive each segment 202 through a link between CDN edge node 402 and client device 102. The link may be defined as a physical connection between CDN edge node 402 and client device 102. While it may be possible that data for different connections of different threads 204 may physically go through different paths, the connections are still between CDN edge node 402 and client device 102. Most likely, connections between CDN edge node 402 and client device 102 go through the same link. However, if different links are used, then the two links may be treated as multiple paths, which may be similar to multiple links to different CDN edge nodes 402.

In FIG. 5, thread #1 204-1 has a connection to a CDN edge node #1 502-1. CDN edge node #1 502-1 may be associated with CDN #1 106-1. Thread #2 204-2 includes a connection to CDN edge node #2 502-2. In some embodiments, CDN edge node #2 502-2 is associated with a content delivery network #2 106-2. However, CDN edge node #2 502-2 may be associated with the same content delivery network 106 as CDN edge node #1 502-1. Thread #3 204-3 includes a connection with a CDN edge node #3 302-3. As with CDN edge node #2 502-2, CDN edge node #3 302-3 may be found in a different content delivery network 106 than both CDN edge node #1 502-1 and CDN edge node #2 502-2. However, CDN edge node #3 302-3 may be found in the same content delivery network 106 as either CDN edge node #1 502-1 or CDN edge node #2 502-2. In this configuration, in some embodiments, client device 102 may open two or more connections with two or more CDN edge nodes 402.

An advantage of using different CDN edge nodes 402 may be that a content delivery network 106 may have a fixed amount of computing resources to deliver videos through a link. If the same content delivery network 106 and/or CDN edge node 402 is used to open connections, then the available bandwidth that that content delivery network 106 can offer may be limited. However, using separate content delivery networks 106 and/or CDN edge nodes 402 for each connection may allow each connection to use different paths, which may offer more overall available bandwidth.

In some embodiments, client device 102 may use a single thread 204 when video playback first starts. For example, when multiple threads 204 are being used, computing resources of client device 102 are being shared between those threads 204, which may delay the download time for an individual video segment 202. That is, using concurrent downloading may increase the download duration for a single segment, but increase overall bandwidth (e.g., more data for multiple video segments is downloaded during a time period). However, if a single thread 204 is used, that single thread 204 may have full use of the computing resources that are available to download the initial video segments 202 and reduce the start time for the video.

After a set time period elapses, then client device 102 may use concurrent downloading to increase the overall bandwidth. Thread control engine 116 may determine a number of threads 204 to use to optimize the bandwidth where thread control engine 116 may add threads 204 when resources are available to increase the bandwidth and remove threads 204 when resources are not available to support the increased bandwidth. That is, thread control engine 116 may remove a thread because the video segments are not being concurrently downloaded fast enough to support a desired playback experience (e.g., to avoid rebuffering). However, when there are available resources to add a thread 204 without affecting the video playback, thread control 116 may add a thread.

Figure 6:
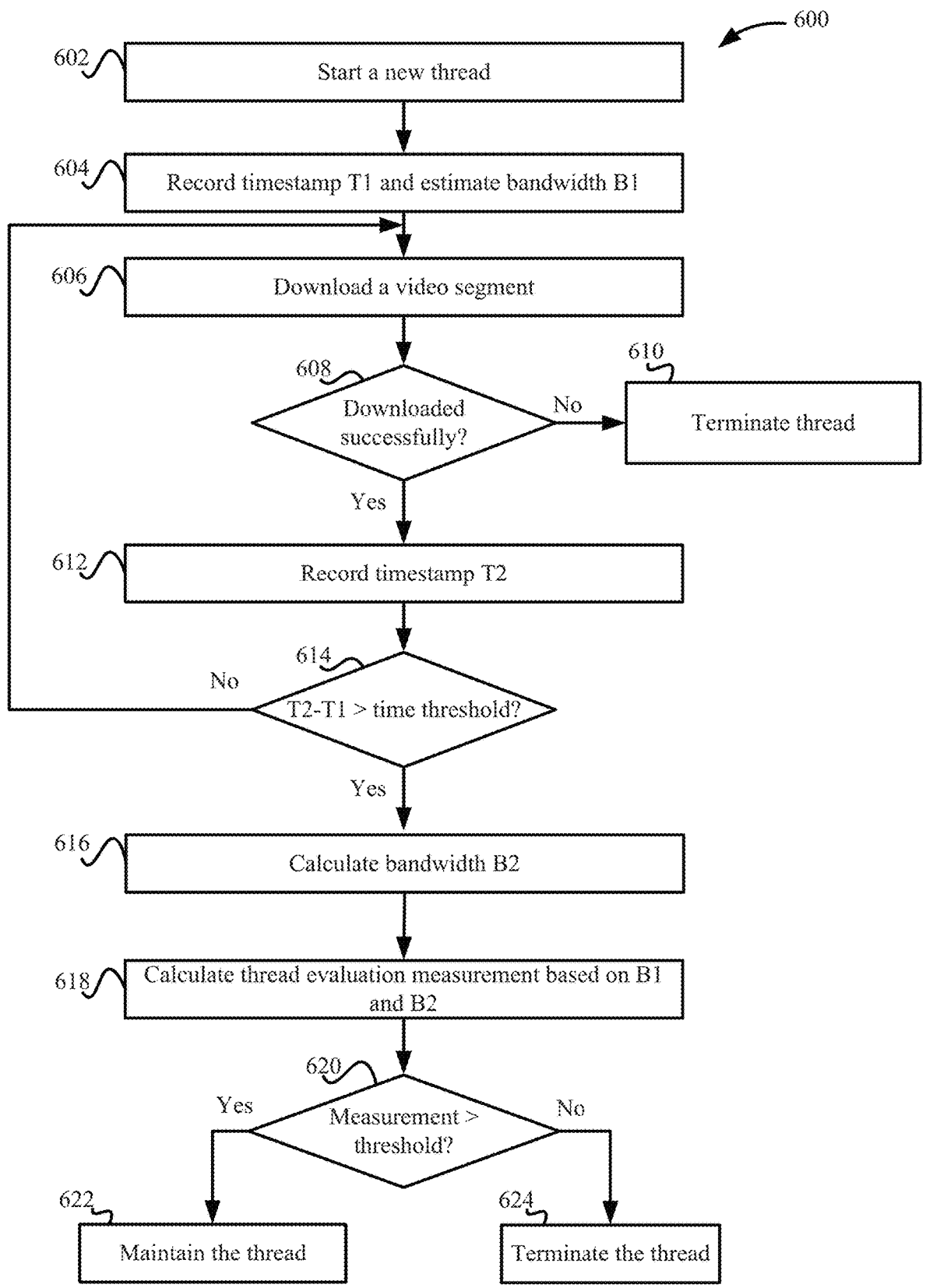
FIG. 6 depicts a simplified flowchart of a method for controlling threads according to some embodiments.

FIG. 6 depicts a simplified flowchart 600 of a method for controlling threads 204 according to some embodiments. The process described may be performed after the start of video playback and a number of threads 204 may be downloading video segments 202. For example, client device 102 may download video segments 202 using a single thread 204 until some data is buffered. Then, client device 102 may open of number of threads 204 and connections to concurrently download the video segments 202. Thereafter, thread control engine 116 may determine when to add a new thread 204 or remove a thread 204. In some embodiments, thread control engine 116 may test whether adding a new thread provides an advantage during playback, such as additional bandwidth, while not affecting playback adversely.

At 602, thread control engine 116 starts a new thread 204. New thread 204 may have a connection with a new content delivery network 106 that is currently not being used by other threads 204 that are running on client device 102. However, new thread 204 may have a connection to a currently used content delivery network 106 and/or a currently used CDN edge node 402. Also, new thread 204 may be on a CDN edge node 402 that is currently not being used, but is on a same content delivery network 106 that is being used by another thread 204. The advantage of using a CDN edge node 402 with a content delivery network 106 that is currently not being used is that CDN edge node 402 or that content delivery network 106 may have more resources available for a connection to client device 102.

At 604, thread control engine 116 records a time stamp T1 and estimates a bandwidth B1. The time stamp T1 starts a timer that will be used to test the performance of new thread 204. Bandwidth estimator 114 may estimate the bandwidth as described above using a time window. As will be discussed below, thread control engine 116 uses the bandwidth B1 to determine an evaluation metric to evaluate the performance of new thread 204.

At 606, client device 102 downloads a video segment using new thread 204. Although one video segment is described, multiple video segments 202 may be downloaded, such as concurrently via threads 204.

At 608, thread control engine 116 determines if the video segment 202 is downloaded successfully by new thread 204. If not, at 610, thread control engine 116 may terminate new thread 204. Thread control engine 116 may terminate new thread 204 because there may be an error with downloading video segments 202. However, thread control engine 116 may use other factors to determine whether to terminate new thread 204, such as a threshold of a number of video segments 202 may have to fail before terminating new thread 204.

At 612, thread control engine 116 records a time stamp T2. At 614, thread control engine 116 determines if a time has elapsed that is above a time threshold. For example, time T2 minus time T1 should be greater than a time threshold. The time threshold is an amount of time that thread control engine 116 waits until testing to see if new thread 204 is performing correctly. If the time has not elapsed, the process reiterates to continue downloading video segments 202 using new thread 204.

At 616, when the time has elapsed, thread control engine 116 calculates a bandwidth B2. Bandwidth B2 may be from time T2 to the last recorded time T1. Bandwidth estimator 114 may estimate the bandwidth B2 within a time window for the concurrently downloading threads 204.

At 618, thread control engine 116 calculates a thread evaluation measurement based on bandwidth B1 and bandwidth B2. Different thread evaluation measurements may be used. For example, the thread evaluation measurement may evaluate the impact on client device 102 when adding new thread 204. In some embodiments, a metric of a change in estimated bandwidth may be used as the thread evaluation measurement. If the estimated bandwidth that is contributed by a first-in thread is estimated bandwidth$_n$, the thread evaluation measurement for an $n_{th}$ thread may be measured by the gain in the estimated bandwidth for that $n_{th}$ thread. For example, the gain of estimated bandwidth may be measured for new thread 204 using the following:

$$ROI_n = \frac{\text{estimated bandwidth}_n - \text{estimated bandwidth}_{n-1}}{\text{estimated bandwidth}_{n-1}}.$$

The above calculation measures the difference in estimated bandwidth with the added new thread 204 and without the added new thread 204. The thread evaluation measurement may be a percentage improvement based on adding new thread 204.

At 620, thread control engine 116 determines if the thread evaluation measurement is greater than a threshold, such as by comparing the thread evaluation measurement to the threshold. For example, if the improvement is greater than a threshold, then using new thread 204 improves the performance. However, if the measurement is not greater than the threshold, the use of new thread 204 does not provide enough improvement. Accordingly, if the measurement is greater than the threshold, then at 622, thread control engine 116 maintains new thread 204. However, if the measurement is not above a threshold, then at 624, thread control engine 116 terminates new thread 204.

Thread control engine 116 may also determine when to shut down threads 204. For example, when a buffer length goes below a threshold, thread control engine 116 may evaluate whether to shut down actively running threads 204. When a buffer length goes below a threshold, then there may be a danger that rebuffering may occur because not enough video is being stored in the buffer. Rebuffering is undesirable and thread control engine 116 may take actions to reduce the chances of rebuffering. For example, if fewer threads 204 are used to concurrently download video segments, the smaller number of threads 204 may download their respective segments faster due to less competition for computing resources of client device 102. For example, if segment #3 is the next segment that needs to be downloaded, thread control engine 116 may maintain that thread 204, which is downloading segment #3. However, thread control engine 116 may select other threads 204 to shut down. For example, if a thread 204 is downloading (or going to download) a segment #6, which is after segment #4 and segment #5, thread control engine 116 may shut down that thread 204. At a later time, another thread 204 may download segment #6. However, by shutting down a thread 204, client device 102 may be able to download segment #3 faster because more computing resources may be available on client device 102. Downloading segment #3 faster may reduce the chances of a rebuffering occurrence because there is less chance of data in the buffer being depleted. In other examples, thread control engine 116 may shut down all threads 204 except for the thread downloading segment #3, or a portion of other threads 204. Although buffer length is described, thread control engine 116 may use factors other than buffer length to determine whether to remove a thread. For example, a percentage of computing resources being used on client device 102 may be used. Then thread control engine 116 may reduce the number of threads 204 being used when the percentage of computer resource usage on client device 102 meets (e.g., goes above) a threshold.

CONCLUSION

Accordingly, by accurately measuring bandwidth, client device 102 can determine a number of threads 204 to use to concurrently download video segments of a video. Client device 102 uses a thread evaluation measurement based on the bandwidth estimation to dynamically remove or add threads 204 to maximize the bandwidth through the connections with one or more content delivery networks 102.

Example Embodiments

In some embodiments, a method comprising: receiving, by a computing device, a plurality of video segments of a video using a plurality of computing instances; measuring, by the computing device, data received for the plurality of computing instances during a time window, wherein a video segment for a computing instance in the plurality of computing instances is not fully downloaded during the time window; calculating, by the computing device, a video delivery metric for the plurality of computing instances based on the data received; calculating, by the computing device, an evaluation measurement based on the video delivery metric; and using, by the computing device, the evaluation measurement to control an addition or a termination of a computing instance.

In some embodiments, receiving the plurality of video segments comprises: receiving two sequential video segments in the video using two computing instances.

In some embodiments, receiving the plurality of video segments comprises: wherein each of the plurality of computing instances receives a unique video segment in the video during the time window.

In some embodiments, receiving the plurality of video segments comprises: receiving a portion of the video segment that is not fully downloaded during the time window.

In some embodiments, measuring the video delivery metric for the plurality of computing instances during the time window comprises: measuring a first amount of data that is received by a first computing instance during the time window; and measuring a second amount of data that is received by a second computing instance during the time window.

In some embodiments, at least one of the first amount of data and the second amount of data is less than data found in the video segment that is not fully downloaded during the time window.

In some embodiments, measuring the video delivery metric for the plurality of computing instances during the time window comprises: at a first time, measuring data received by the plurality of computing instances; at a second time, stopping measuring data received by the plurality of computing instances; and using the data measured between the first time and the second time to measure the video delivery metric.

In some embodiments, measuring the video delivery metric for the plurality of computing instances during the time window comprises: detecting a status of a computing instance in the plurality of computing instances; and ending the measuring of data during the time window based on the status of the computing instance.

In some embodiments, measuring the video delivery metric for the plurality of connections during the time window comprises: detecting a status of a computing instance in the plurality of computing instances; and starting the measuring of data during the time window based on a plurality of connections having the status of actively receiving data.

In some embodiments, calculating the evaluation measurement based on the video delivery metric comprises: estimating a first video delivery metric at a first time without using an additional computing instance; estimating a second video delivery metric at a second time while using the additional computing instance; and calculating the evaluation measurement based on the first video delivery metric and the second video delivery metric.

In some embodiments, calculating the evaluation measurement based on the video delivery metric comprises: calculating a change in video delivery metric based on the first video delivery metric and the second video delivery metric between the first time and the second time, wherein the additional thread receives data between the first time and the second time.

In some embodiments, calculating the evaluation measurement based on the video delivery metric comprises: comparing the evaluation measurement to a threshold; when the evaluation measurement meets the threshold, using the additional computing instance to receive data for another video segment; and when the evaluation measurement does not meet the threshold, not using the additional computing instance to receive data for the another video segment.

In some embodiments, the plurality of computing instances are connected to a single node to receive the plurality of video segments.

In some embodiments, each of the plurality of computing instances are connected to a different node to receive respective video segments in the plurality of video segments.

In some embodiments, at least two of the plurality of computing instances are connected to a different content delivery network.

In some embodiments, a non-transitory computer-readable storage medium containing instructions, that when executed, control a computer system to be operable for: receiving a plurality of video segments of a video using a plurality of computing instances; measuring data received for the plurality of computing instances during a time window, wherein a video segment for a computing instance in the plurality of computing instances is not fully downloaded during the time window; calculating a video delivery metric for the plurality of computing instances based on the data received; calculating an evaluation measurement based on the video delivery metric; and using the evaluation measurement to control an addition or a termination of a computing instance.

In some embodiments, measuring the video delivery metric for the plurality of computing instances during the time window comprises: measuring a first amount of data that is received by a first computing instance during the time window; and measuring a second amount of data that is received by a second computing instance during the time window.

In some embodiments, measuring the video delivery metric for the plurality of computing instances during the time window comprises: at a first time, measuring data received by the plurality of computing instances; at a second time, stopping measuring data received by the plurality of computing instances; and using the data measured between the first time and the second time to measure the video delivery metric.

In some embodiments, calculating the evaluation measurement based on the video delivery metric comprises: estimating a first video delivery metric at a first time without using an additional computing instance; estimating a second video delivery metric at a second time while using the additional computing instance; and calculating the evaluation measurement based on the first video delivery metric and the second video delivery metric.

In some embodiments, an apparatus comprising: one or more computer processors; and a non-transitory computer-readable storage medium comprising instructions, that when executed, control the one or more computer processors to be operable for: receiving a plurality of video segments of a video using a plurality of computing instances; measuring data received for the plurality of computing instances during a time window, wherein a video segment for a computing instance in the plurality of computing instances is not fully downloaded during the time window; calculating a video delivery metric for the plurality of computing instances based on the data received; calculating an evaluation measurement based on the video delivery metric; and using the evaluation measurement to control an addition or a termination of a computing instance.

System

Figure 7:
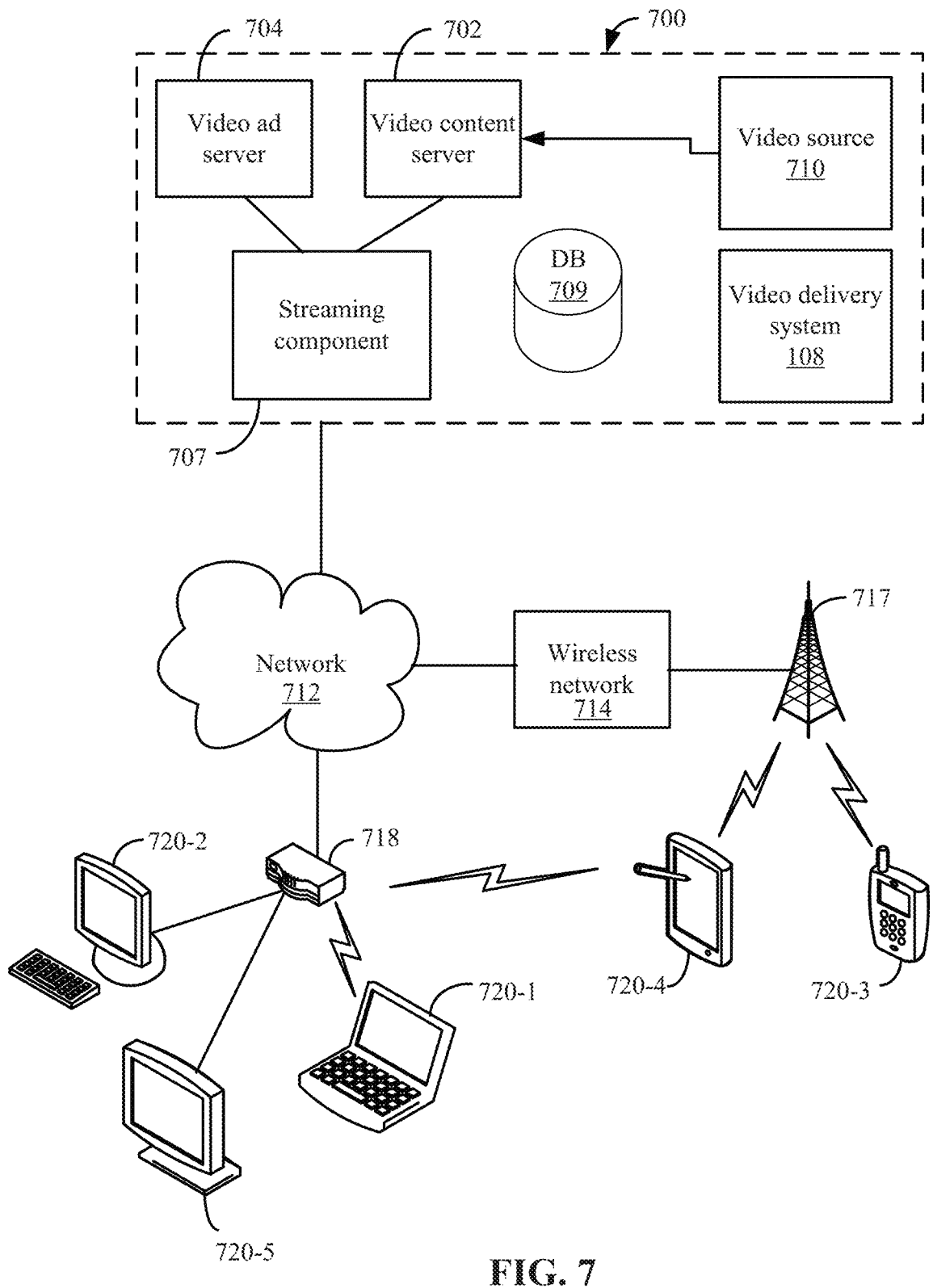
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include video delivery system 108.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as Hypertext Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
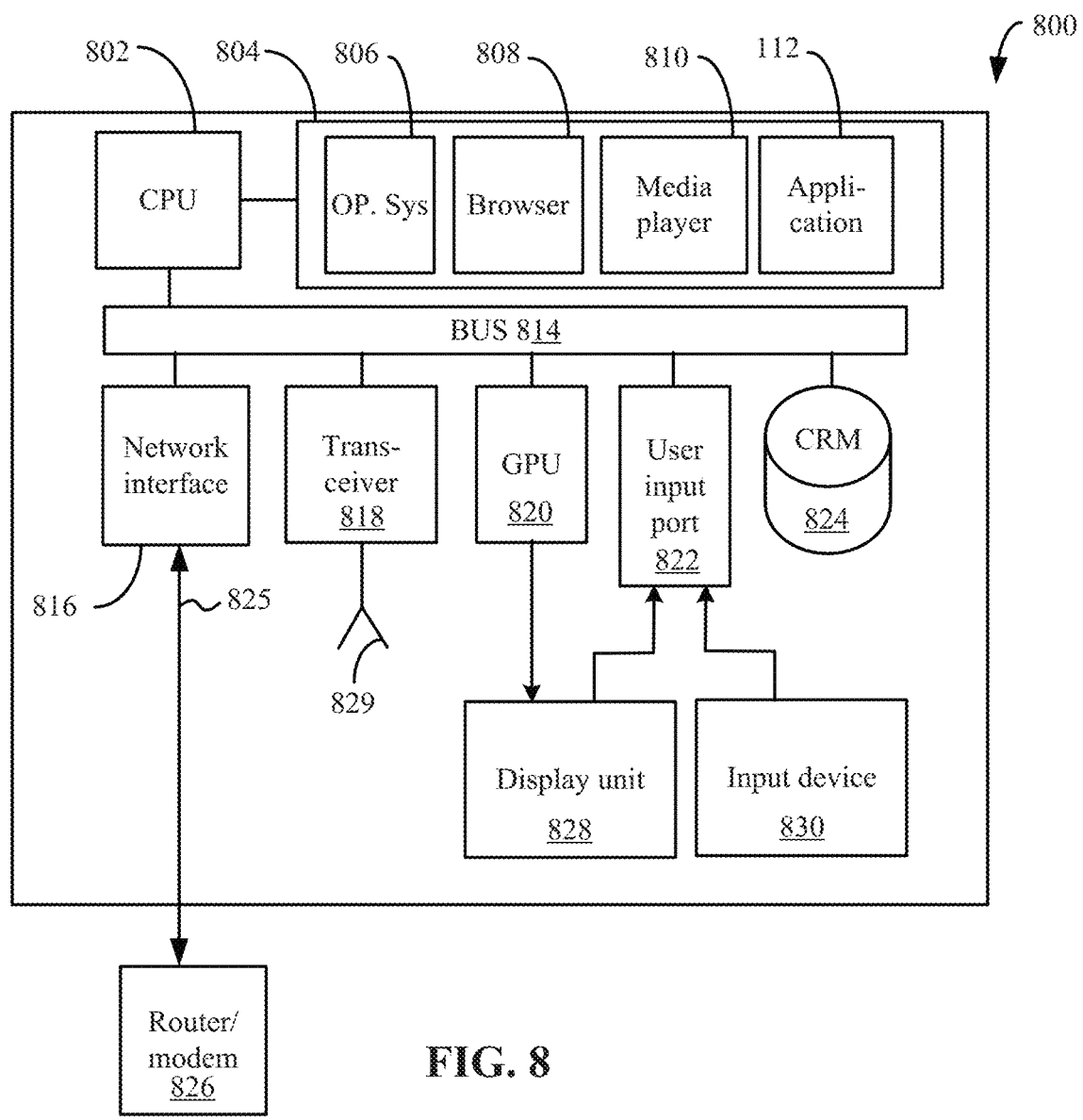
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include application 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a first set of video segments of a video, wherein the video includes a plurality of segments, and wherein the first set of video segments is received using a set of second computing instances;
   playing, by the computing device, at least a portion of the first set of video segments;
   after playing the at least a portion of the first set of video segments of the video, starting, by the computing device, a first computing instance for receiving video segments of the video, wherein the first computing instance is different from the set of second computing instances;
   receiving, by the computing device, a video segment of the video using the first computing instance;
   calculating, by the computing device, a measurement based on receiving the video segment; and
   using, by the computing device, the measurement to determine whether the first computing instance should continue to be used to receive video segments in the video or should be terminated to not receive video segments in the video.

2. The method of claim 1, wherein:
   the first computing instance receives the video segment and the set of second computing instances receive a second set of video segments from the video concurrently.

3. The method of claim 2, wherein:
   the video segment and the second set of video segments are different video segments from the video.

4. The method of claim 1, wherein:
   the first computing instance receives the video segment from a first content delivery network that is different from a second content delivery network that sent one of the first set of video segments.

5. The method of claim 1, wherein:
   the first computing instance receives the video segment from a same content delivery network that sent one of the first set of video segments.

6. The method of claim 1, wherein:
   the first computing instance receives the video segment from a first edge node that is different from a second edge node that sent one of the first set of video segments.

7. The method of claim 1, wherein the measurement comprises a first measurement from a first time period, and wherein calculating the measurement comprises:
   determining a second measurement from a second time period, wherein the second time period is from before the start of the first computing instance, and the first time period is after the start of the first computing instance; and
   using the first measurement and the second measurement to determine whether the first computing instance should continue to be used to receive video segments in the video or should be terminated to not receive video segments in the video.

8. The method of claim 7, wherein:
   the first measurement is a first bandwidth from the first time period, and
   the second measurement is a second bandwidth from the second time period.

9. The method of claim 7, wherein using the first measurement and the second measurement comprises:
   determining a third bandwidth that is contributed by the first computing instance from the first measurement and the second measurement, wherein the third bandwidth is used to determine whether the first computing instance should continue to be used to receive video segments in the video or should be terminated to not receive video segments in the video.

10. The method of claim 7, wherein using the first measurement and the second measurement comprises:
    determining a change in bandwidth that is contributed by the first computing instance from the first measurement and the second measurement, wherein the change in bandwidth is used to determine whether the first computing instance should continue to be used to receive video segments in the video or should be terminated to not receive video segments in the video.

11. The method of claim 1, further comprising:
terminating the first computing instance when the measurement does not meet a threshold.

12. The method of claim 1, further comprising:
continuing to receive video segments using the first computing instance when the measurement meets a threshold.

13. The method of claim 12, wherein the first computing instance is added to a set of computing instances to form a new set of computing instances that is used to receive video segments of the video.

14. The method of claim 1, further comprising:
determining whether the video segment is received successfully;
if the video segment is not received successfully, terminating the first computing instance; and
if the video segment is received successfully, continuing to calculate the measurement.

15. The method of claim 1, further comprising:
analyzing a buffer length of a buffer that is storing video segments that are received; and
when the buffer length is below a threshold, reviewing the first computing instance and a set of computing instances that are being used to receive video segments in the video to determine whether to terminate a computing instance in the first computing instance or the set of computing instances.

16. A method comprising:
downloading, by a computing device, a first portion of a plurality of video segments of a video using a set of computing instances;
determining, by the computing device, when resources are available to support an additional computing instance;
when resources are available to support the additional computing instance, adding, by the computing device, a new computing instance to execute on the computing device to start downloading video segments from the video, wherein the new computing instance and another computing instance in the set of computing instances are configured to download video segments in a second portion of the plurality of video segments;
determining, by the computing device, when resources are not available to support the set of computing devices; and
when resources are not available to support the set of computing devices, terminating, by the computing device, one computing instance in the set of computing instances that is executing on the computing device to stop downloading video segments from the video to create a new set of computing instances, wherein computing instances in the new set of computing instances are configured to download the second portion of the plurality of video segments without the one computing instance.

17. The method of claim 16, wherein determining when resources are available to support an additional computing instance comprises:
determining when resources are available to support an increased bandwidth to download video segments from the video.

18. The method of claim 16, wherein determining when resources are not available to support the set of computing devices comprises:
analyzing a buffer length of a buffer that is storing video segments that are downloaded; and
when the buffer length is below a threshold, reviewing the set of computing instances that is being used to download video segments in the video to determine whether to terminate one of the set of computing instances.

19. A non-transitory computer-readable storage medium containing instructions, that when executed, control a computer system to be operable for:
receiving a first set of video segments of a video, wherein the video includes a plurality of segments, and wherein the first set of video segments is received using a set of second computing instances;
playing at least a portion of the first set of video segments;
after playing the at least a portion of the first set of video segments of the video, starting a first computing instance for receiving video segments of the video, wherein the first computing instance is different from the set of second computing instances;
receiving a video segment of the video using the first computing instance;
calculating a measurement based on receiving the video segment; and
using the measurement to determine whether the first computing instance should continue to be used to receive video segments in the video or should be terminated to not receive video segments in the video.

\* \* \* \* \*